(12) United States Patent
Puente et al.

(10) Patent No.: US 7,281,260 B2
(45) Date of Patent: Oct. 9, 2007

(54) STREAMING MEDIA PUBLISHING SYSTEM AND METHOD

(75) Inventors: David S. Puente, Olney, MD (US); Jeffrey Rule, Ashburn, VA (US)

(73) Assignee: Loral Cyberstar, Inc., Rockville, MD (US)

( * ) Notice: Subject to any disclaimer, the term of this patent is extended or adjusted under 35 U.S.C. 154(b) by 1458 days.

(21) Appl. No.: 09/924,036

(22) Filed: Aug. 7, 2001

(65) Prior Publication Data

US 2003/0033606 A1    Feb. 13, 2003

(51) Int. Cl.
*H04N 7/173* (2006.01)
(52) U.S. Cl. .................... 725/110; 725/109; 725/136
(58) Field of Classification Search ........ 725/109–113, 725/136; 709/231
See application file for complete search history.

(56) References Cited

U.S. PATENT DOCUMENTS

| | | | |
|---|---|---|---|
| 5,991,306 A * | 11/1999 | Burns et al. ................. | 370/429 |
| 6,588,013 B1 * | 7/2003 | Lumley et al. ............... | 725/32 |
| 6,795,092 B1 * | 9/2004 | Nagai et al. ................ | 715/716 |
| 2005/0076378 A1 * | 4/2005 | Omoigui ..................... | 725/87 |

* cited by examiner

*Primary Examiner*—Andrew Y. Koenig
*Assistant Examiner*—Harun Yimam
(74) *Attorney, Agent, or Firm*—A. W. Karambelas; K. W. Float

(57) ABSTRACT

A streaming media publishing system and method for use in delivering streaming media to personal computers. The streaming media publishing system and method preferably delivers streaming media content by way of a broadband satellite-based communications network. A content processing center receives media content in analog, digital and textual formats from a content provider or corporation. The media content is processed at the content processing center to produce a streaming media presentation. The streaming media presentation comprises a video and audio stream that includes searchable metadata that is integrated with HTML web pages. The content processing center communicates by way of a satellite or terrestrial link 18 with a cache server that stores the streaming media presentation. The streaming media presentation displayed on the client personal computers using web browser software and by selecting an thumbnail representative of the presentation. The metadata may be searched to allow a user to jump to the a particular word in the presentation. Words contained in each HTML page may be indexed to permit searching based upon the use of <meta> tag placed in headers of each HTML page. Markers may also be placed in the video that allow users to jump to various points in the presentation.

5 Claims, 5 Drawing Sheets

Fig. 4

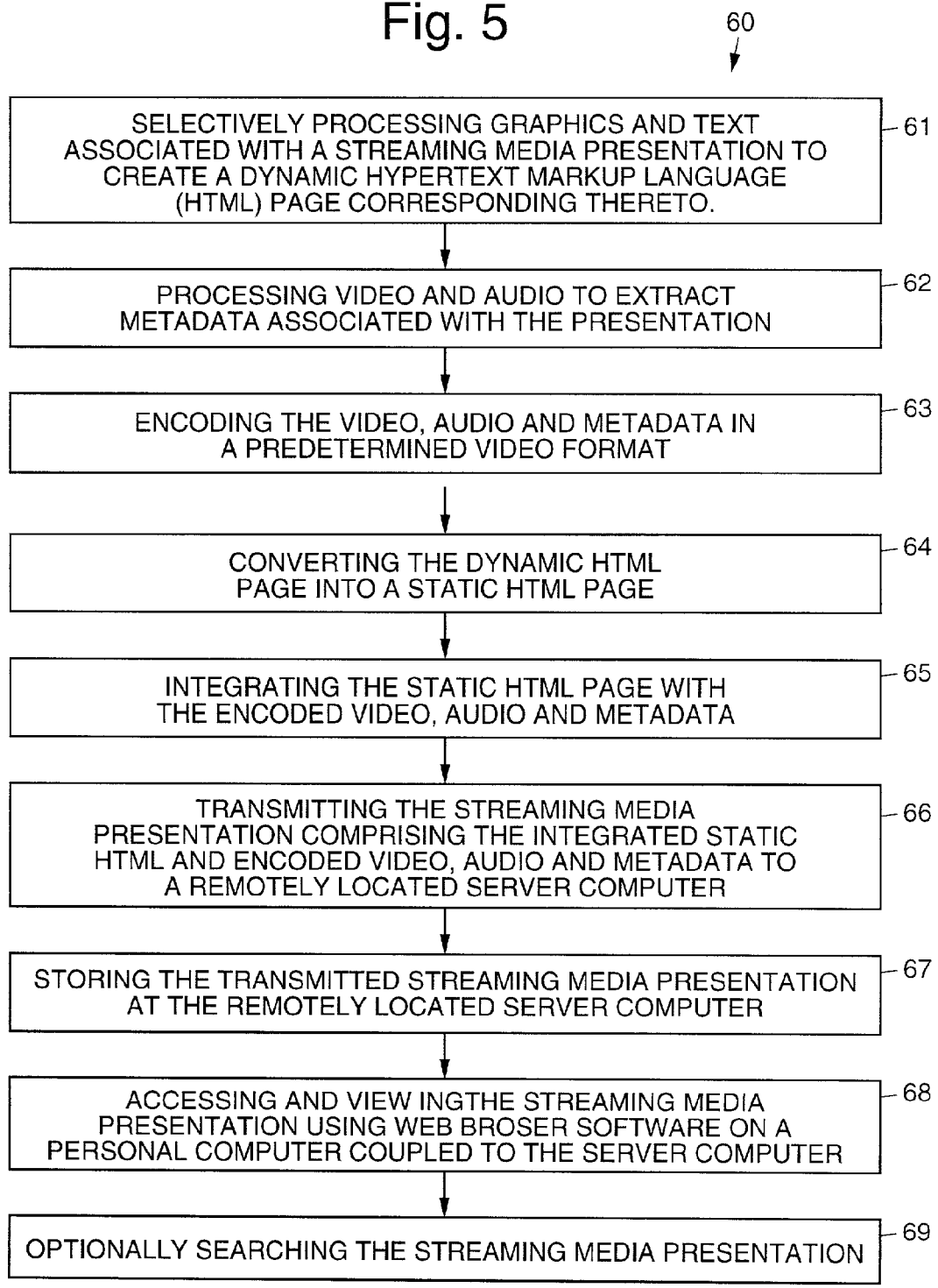

STREAMING MEDIA PUBLISHING SYSTEM AND METHOD

BACKGROUND

The present invention relates generally to data communication systems and methods, and more specifically, to a streaming media publishing system and method.

There is growing demand by Internet users for streaming audio services, such as to download recorded audio programming. However, it is believed that the Web video streaming market will take at least 3-5 years to develop because TV programmers and cable operators lack appropriate business and economic models.

Problems include copyright control, bandwidth restrictions, poor video quality, lack of technical standards, and possible signal piracy. The technical limitations of currently available digital cable set-top boxes and cannibalization of TV channels would hamper development of video streaming from Web sites. It is also possible that some cable operators and programmers might use limited video streaming as a "branding tool" to drive Web users to their TV channels, retain cable subscribers, and build customer databases online.

However, video-on-demand (VoD) services, unlike video streaming, is on the rise because of consumer willingness to pay premium charges for VoD movies, games and other services due to added convenience, control, and personalization that they offer. It is believed that cable operators could use their closed proprietary systems, rather than the Internet's open technical standards, to deliver VoD services to subscribers.

The Internet was not designed to stream high quality video because it is made up of many networks managed by different communications companies. The architecture of the Internet lacks the ability to control traffic between networks. Congestion and loss of data can keep broadband video from reaching end users with a sustained quality of service.

More particularly, the Internet has emerged as a global medium for commerce and communications. It has been estimated that there were approximately 142 million Internet users at the end of 1998 and that the number of users will grow to 502 million by the end of 2002. The growth in the number of users, along with the wealth of content and information available on the Internet, have led to increases in the daily traffic volume of web sites. It has been estimated that the number of unique visitors to the top 25 web sites increased from 224 million in Jun. 1998 to 330 million in Jun. 1999.

The ability of a web site to attract users in part is based on the richness of its content. Increasingly, web sites want to enhance their content by adding graphics, such as photographs, images and logos, as well as deploying newer technologies, such as video and audio streaming, animation and software downloads. While richer content attracts more visitors, it also places increasing demands on the web site and the transmission network to deliver the content quickly and reliably. As a result, web sites typically constrain the amount of rich content, thus sacrificing the quality of the user experience to maintain minimally acceptable performance levels.

The Internet was not designed to provide a rich multimedia environment for individual web site visitors. Since its origin as a United States department of defense research project, the Internet has evolved into an aggregation of many networks each developed and managed by different telecommunication service providers. As a result, the Internet lacks the ability to significantly manage traffic between disparate networks to find the optimal route to deliver content. Congestion or transmission blockages significantly delay the information reaching he user. The storage of web site data in central locations further complicates Internet content delivery. As the volume of information requested on a web site increases, large quantities of repetitive data traverse the Internet from that central location.

The combination of richer content and increasing volumes of web site visitors can significantly lengthen the time required for a user to download information from a site and cause the site to crash. Web site performance problems are exacerbated during peak demand times, such as a breaking news event, the release of an online movie trailer. the first day of ticket sales for a hit film, an on online special event or a sudden demand for new software release. Because it is typically not cost effective for a web site to design its infrastructure to handle relatively infrequent periods of "flash" or sudden demand, periods of peak network traffic and surges in traffic volumes often overwhelm the capacity of the web site, causing long delays or complete site outages. Delays and web site crashes often cause user frustration, disappointment and the use of alternative web sites.

While various products and services have been developed to address performance problems, they generally do not address fundamental architectural limitations of the Internet. For example, caching is a hardware and/or software solution sold to Internet service providers to help them improve network performance by placing electronic copies of selected Internet content on geographically distributed servers on their own network. Caching is not however designed to address the needs of the web site to deliver content with high performance and reliability across multiple networks that make up the Internet. Outsourcing web server management to hosting companies enables web sites to add server capacity as needed and increase server reliability. However, hosting does not address transmission disruption problems that can arise as data leaves the hosting company's servers and traverses the public network to the user. Broadband services are being deployed to increase the speed of a user's connection to the Internet, addressing problems that occur in what is commonly known as the "last mile." While these services increase bandwidth in the last mile, they do not address content delivery problems that occur when congestion overwhelms a web site or specific points across the Internet.

To serve the increasing volumes of traffic on the Internet and at the same time, enhance the user experience with increased graphic, video and audio content, web sites require content delivery services that can provide rich content to users. The delivery services should enhance web site response times, avoid delays and outages caused by peak demand and public network congestion. These services must not only be fast, reliable and easy to implement; but must be capable of delivering rich content that is continually updated. These services may be cost effective for the customer only if they do not require significant capital or labor expenditures and can be implemented at a cost that is based on actual usage.

Satellites have proven to be the best technology available for the delivery of video services. As the Internet grows to include increasing streaming video content, a satellite network such as that used by the assignee of the present invention offers the most efficient global end-to-end delivery system available in the world. The quality of service offered by the assignee of the present invention is differentiated by its ability to move information around the world in a manner that avoids congestion.

Internet data flows like water, down stream, looking for the path of least resistance. The satellite network used by the assignee of the present invention provides a path of least resistance for a growing segment of Internet traffic, streaming media, requiring real time delivery with a constant sustained data flow. Video information is distinguished from other web traffic, in the amount of transmission bandwidth required to deliver acceptable quality to the widest distribution audience. Information flows through the satellite network because of its sustained higher end to end speed and its ability to reach many users simultaneously.

Along with the quality improvements required for distribution of data over the Internet, application services are being demanded by end users. There is already an established demand for business to consumer services with content delivered to consumer personal computers.

The deployment of edge of net servers is enabling the streaming media market. Ever increasing amounts of content is being encoded in Real, Microsoft, Optibase and Quicktime formats. Real Networks media player distribution represents 85% of the deployed streaming technology worldwide and its use permits access to the broadest audience. End-user desktops employ media player technology; for instance, a Windows Media player is included in every version of Windows software.

As the streaming media market develops, content hosting and aggregation is evolving separately form current data hosting services for web sites to companies specializing in the broadband delivery of data. This leaves a new opportunity for streaming media services companies.

Today's Internet delivery via terrestrial infrastructure does not effectively support multicasting particularly broadband streaming applications and may not support multicasting for the next several years. Terrestrial IP multicasting has been characterized as a technology that has been two years away for ten years. Multicast via satellite is viewed as a solution to overcome the broadcast limitations of the Internet. The problems of terrestrial multicast will become more acute as the number of end users trying to receive a multicast stream grows. With a satellite solution, the incremental cost to add a new user at a broadband information rate is less than the cost to add the customer via the terrestrial infrastructure. Since terrestrial networks will struggle with IP multicasting in the near future an opportunity to deliver broadband applications services directly to Internet service providers and enterprises exists.

The streaming media market is growing because of an abundance of content, application services are being made available, and deployed edge servers are improving the speed of delivery of content. Streaming media services are further improved with high-speed satellite delivery to the edge of the net, bypassing Internet congestion and insuring QoS delivery of real time streaming to the end user.

The availability of high-speed computers capable of at least 133 MHz clock speeds can process streaming media at a minimum rate of 300 Kbps. New streaming encoding technology recently deployed by Real Networks, for example, demonstrates that at data rates between 700 KBPS to 1 Mbps, the end user can receive VHS like quality through a broadband connection. When streaming media can be delivered with application services, the market will put a higher value on the content and providers who enable the delivery of those services.

In view of the above, it is an objective of the present invention to provide for an improved streaming media publishing system and method. It is also an objective of the present invention to provide for a streaming media publishing system and method that delivers streaming media services to personal computers by way of a broadband satellite-based communications network.

SUMMARY OF THE INVENTION

To accomplish the above and other objectives, the present invention provides for a streaming media publishing system and method for use in delivering streaming media services to personal computers. The streaming media publishing system and method preferably delivers streaming media content by way of a broadband satellite-based communications network.

An exemplary system comprises a content processing center that includes a broadcast server that communicates by way of a satellite with a cache server to distribute the streaming media content to one or more client personal computers coupled to the cache server. A content provider or corporation delivers media content, graphics and related data to the content processing center in analog, digital and textual formats where it is processed to produce a streaming media presentation.

At the tent processing center, ASP/HTML pages are prepared that include a thumbnail graphic image representative of each presentation. Also, text and/or audio associated with the presentation is processed to generate metadata that is encoded with the video data. The metadata permits searching of the presentation by the client to access various related points in the presentation. The streaming media presentation comprises a video stream that includes the searchable metadata that is integrated with HTML web pages that are displayed on the client personal computers using web browser software.

The streaming media presentation is stored on the broadcast server. The streaming media presentation is transmitted (pushed) to the cache server where it is stored and accessed by the client personal computers. The client launches the web browser to access a HTML web page containing one or more presentations. The displayed HTML web page includes a thumbnail graphic image representative of each presentation that may be viewed. Selecting a particular thumbnail links to the corresponding video stream and displays the presentation along with associated audio.

The metadata may be searched in a pull-down window, for example, to allow a user to jump to the exact word in the streaming video based on a search. Words contained in each HTML page are indexed to permit searching based upon the use of <meta> tags placed in the header of each HTML page. Furthermore, markers may be placed in the video that allow users to jump to various points in the video.

An exemplary streaming media publishing method comprises the following steps. Graphics and text associated with a streaming media presentation are selectively processed to create a dynamic hypertext markup language (HTML) page corresponding to the presentation. Video and audio are processed to extract metadata associated with the presentation. The video, audio and metadata are encoded in a predetermined video format. A dynamic ASP/HTML page is constructed and is converted into a static HTML page. The static HTML page is integrated with the encoded video, audio and metadata. The streaming media presentation comprising the integrated static HTML and encoded video, audio and metadata is transmitted or broadcast (preferably over a satellite link) to a remotely located server computer where it is stored. A personal computer coupled to the server computer is used to access and view the streaming media presentation using web browser software. The streaming media presentation may be searched using the encoded metadata.

The present system and method are particularly well suited to deliver streaming media to employees of corporations, and the like. The present invention provides corporations and content providers a cost effective global IP delivery network delivering both live and on-demand video-enhanced media to corporate desktops, The present invention is employed with a global network having multiple transponders on multiple satellites and worldwide gateways connected by optical fiber to provide the best option for the delivery of Internet Protocol (IP) video services (streaming media). Delivery of streaming media requires real time delivery of Internet Protocol (IP) packets with a constant sustained data flow. The present streaming media network bypasses conventional network congestion switching points, and delivers streaming media directly to the closest terrestrial ISP point of presence nearest an end user or delivers streaming media directly to a corporate network (LAN) via a satellite downlink.

By bypassing many terrestrial networks, the global satellite and fiber network implemented by the present invention provides end-to-end service delivery standards for streaming media services on a global basis. The typical rate at which streaming media is delivered over the Internet is about 100 to 150 kbps with a high-speed last mile connection to the desktop and with packet loss approaching 3% which results in unsatisfactory video viewing. The present system and method delivers sustained data speeds from 100 Kbps to 1.5 Mbps on a global basis with less than 1% packet loss.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 4 illustrates an exemplary user interface employed in the streaming media publishing system shown in FIG. 1; and FIG. 5 is a flow diagram that illustrates an exemplary streaming media publishing method in accordance with the principles of the present invention.

DETAILED DESCRIPTION

Figure 1:
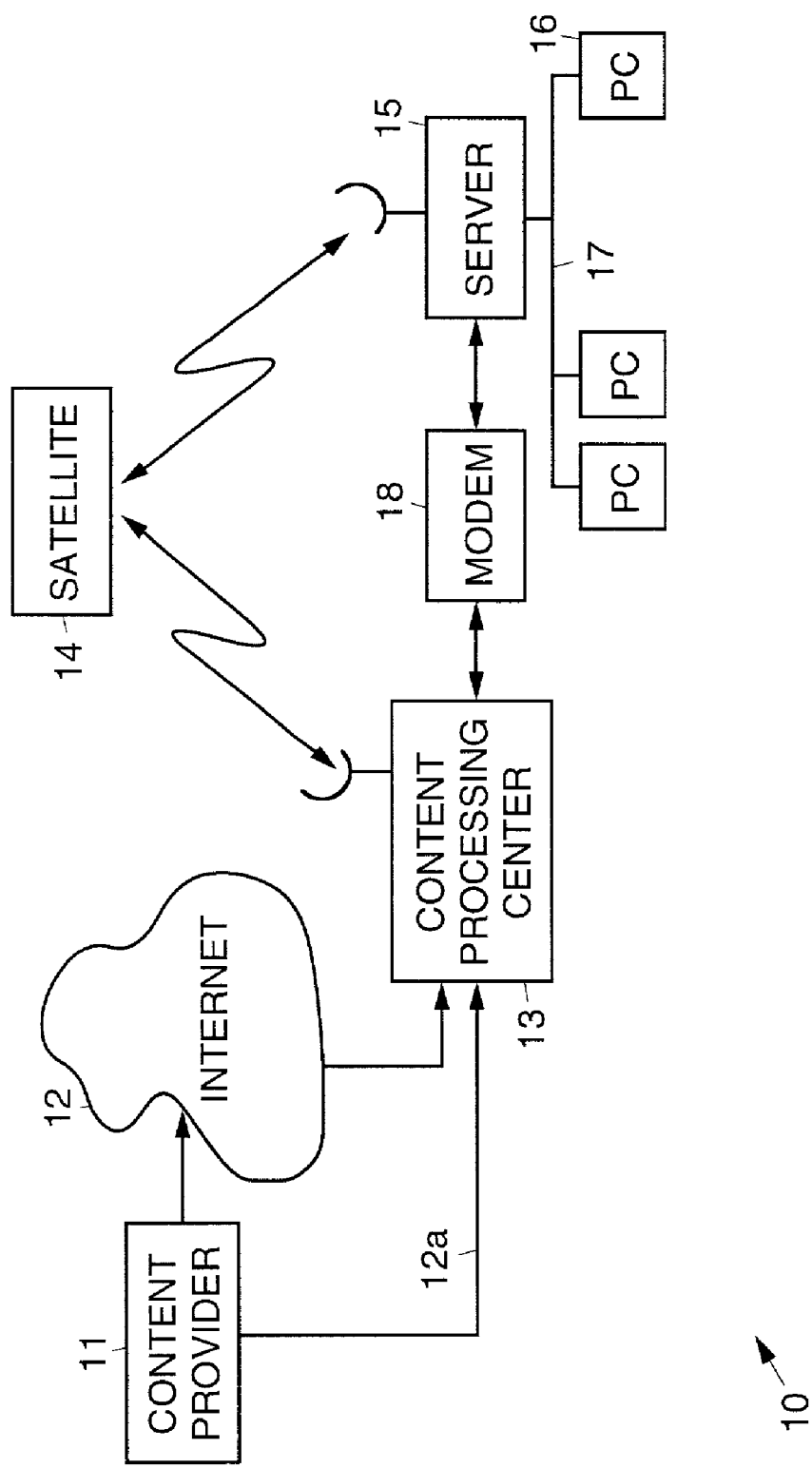
FIG. 1 illustrates an exemplary streaming media publishing system in accordance with the principles of the present invention.

Referring to the drawing figures, FIG. 1 illustrates an exemplary streaming media publishing system 10 in accordance with the principles of the present invention, and is illustrated as a satellite-based streaming media publishing system 10. The system 10 is designed to distribute streaming media derived from one or more content providers 11 by way of a satellite 14 to client personal computers (PCs) 16. The one or more content providers 11 may be corporations that desire to transmit streaming media content to their employees that use the client PCs 16. The system 10 uses Internet protocol (IP) addressing to distribute the streaming media content to the personal computers 16.

The system 10 comprises a content processing center 13. In general, one or more content providers 11 (or corporations 11) communicate by way of a direct line 12a or the Internet 12, for example, to the content processing center 13. The content processing center 13 communicates by way of the satellite 14 and a cache server 15 that is coupled the client personal computers 16.

In typical situations, the client personal computers 16 are coupled to the cache server 15 by way of a local area network 17, or intranet 17. However, it is to be understood that the use of the cache server 15 is not absolutely required. A single user standalone, comparably-equipped personal computer 16 may also provide the same functionality as the cache server 15.

The cache server 15 (or the comparably-equipped standalone personal computer 16) interfaces to the satellite 14. This is achieved using a satellite receiver PC card, for example, disposed in the personal computer 16 or cache server 15. The personal computer 16 or cache server 15 is also coupled by way of a modem 18 to the content processing center 13. The modem 18 provides a low-rate return path that is used to transmit requests from the client personal computers 16 to the content processing center 13 in order to download streaming media derived from the content providers 11 (or corporations 11).

Each of the personal computers 16 includes software 20 that interfaces with the content processing center 13 and the content providers 11 (or corporations 11). The software 20 is used to download and display streaming media presentation at the personal computer 16. The streaming media system 10 and the software 20 cooperate to establish a virtual private multicast network to provide managed delivery of streaming media content to the personal computers 16. The streaming media system 10 and the software 20 cooperate to provide video streaming services with high efficiency that has heretofore not been provided.

The Internet 12 has primarily been used for on-demand media applications. Live streaming accounts for a relatively small percentage of Internet use. In a corporate environment, the need for on demand is of greater importance than live broadcasts due to problems relating to scheduling people's time for viewing information. Companies have tried to solve this problem by rebroadcasting the information to give end users the ability to see a presentation. This method of operation is costly and ineffective.

Problems with the Internet 12 cause the delivery of video to be slow and unreliable, causing many businesses to be skeptical about the ability of the Internet 12 to meet the future demands. It is a goal of the assignee of the present invention to integrate media and distribute that media to as many end points as possible utilizing IP multicast and optical fiber technology to provide the best performance and lowest latency possible to meet customer requirements. Packets are stored on the cache servers 15 (or edge servers 15) to locate the data as close to the user as possible enabling a greater probability that the information will be delivered at the highest quality of service.

The assignee of the present invention collects and aggregates information from originating sources and delivers data to the remotely located personal computers 16 with high reliability and low routing cost. Interactive services are performed over terrestrial connections (such as by way of a modem 18 coupled between the cache server 15 and the content processing center 13) and multicast application are performed using satellites 14. Services provided by the present system 10 also include simulcasting of content by way of satellite and terrestrial network segments. Terrestrial services provide access to locations where satellites 14 are not deployed effectively.

Figure 2:
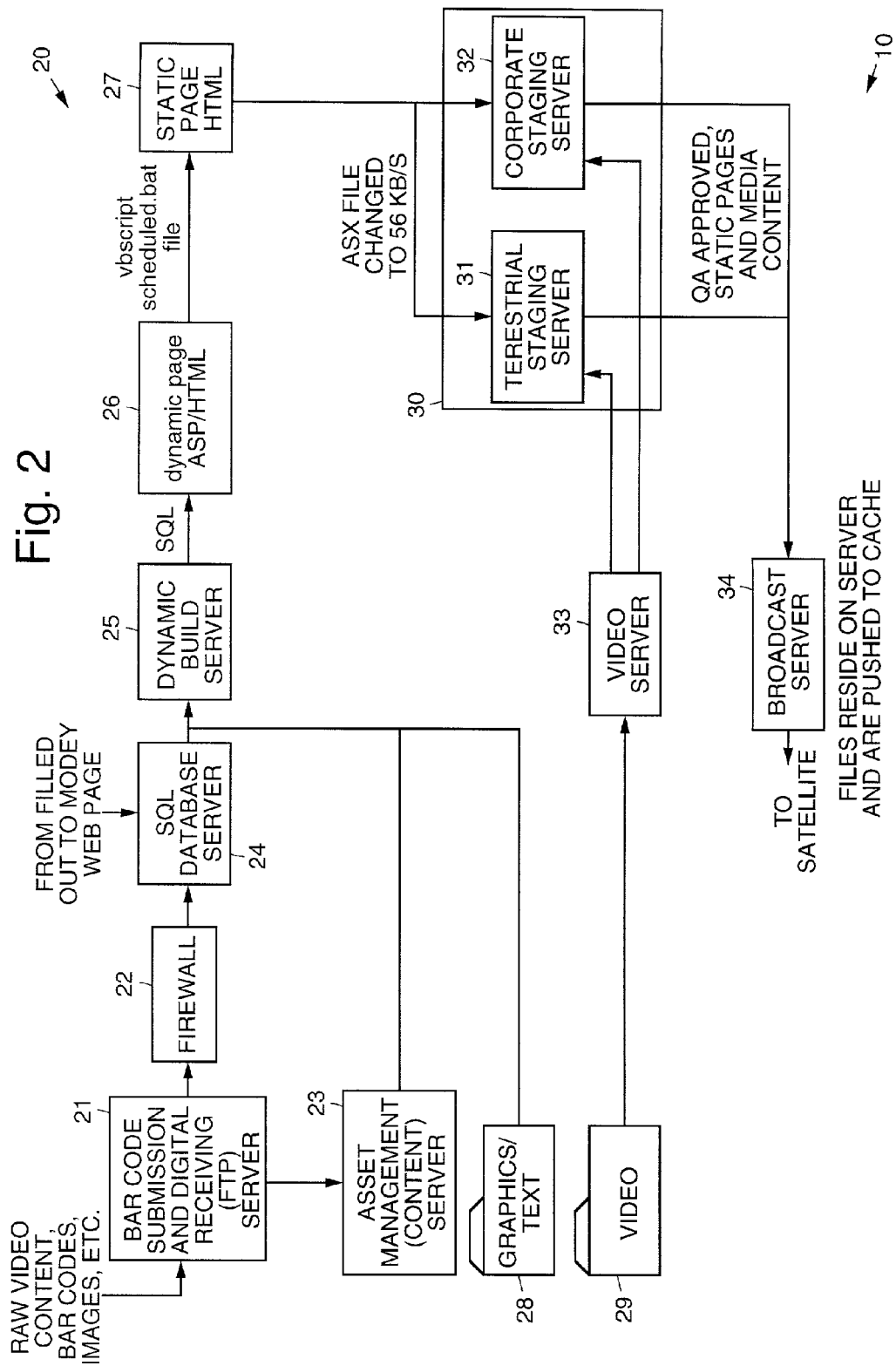
FIG. 2 illustrates details of the exemplary streaming media publishing system shown in FIG. 1.

Referring now to FIG. 2, it illustrates details of the exemplary streaming media publishing system 10, and in particular show equipment primarily employed at the content processing center 13. The streaming media publishing system 10 includes, at the content processing center 13 or other suitable facility, a bar code submission and digital receiving server 21 (or a file transfer protocol (FTP) server 21). The bar code submission and digital receiving (FTP) server 21 receives raw video content, bar codes, and graphic images, and the like, that are to be included in a streaming media presentation that is to be transmitted for viewing. The bar code submission and digital receiving (FTP) server 21 is coupled to a firewall 22 that prevents undesired access to various computers that make up the system 10.

The bar code submission and digital receiving (FTP) server 21 is coupled to an asset management sever 23, or content server 23, that processes the video content, bar codes, and graphic images transmitted by the content providers 11 or corporation. The bar code submission and digital receiving (FTP) server 21 is coupled by way of the firewall 22 to a standardized query language (SQL) database server 24.

Textual data derived from the video content is transferred from the bar code submission and digital receiving (FTP) server 21 to an SQL database residing on the SQL database server 24. Graphic images that are to be included with the streaming media presentation are transferred from the bar code submission and digital receiving (FTP) server 21 to the asset management (content) sever 23 where they are processed.

Graphics and text that are to be included in the streaming media presentation are processed using the asset management (content) sever 23. Also, hardcopy text and graphic images or photographs, for example, may also be processed to create additional text and graphics (thumbnails) for use with the streaming media presentation.

Video data, either received as digitized video 29 or contained on a tape and processed to produced digitized video 29 is loaded into a video server 33. The digitized video 29 is stored on the video server 33.

The asset management (content) sever 23 functions to control the output of the SQL database server 24 along with graphics and text 28 that are associated with the streaming media presentation. Metadata stored in the SQL database server 24, along with the graphics and text 28 are input to a dynamic build server 25. The dynamic build server 25 functions to create dynamic hypertext markup language (HTML) pages 26 that include selected metadata, graphics (thumbnails) and text. The dynamic HTML pages 26 are converted into static HTML pages 27 and are transferred to a staging server 30. The dynamic HTML pages 26 are converted into the static HTML pages 27 so that they may be readily stored on a broadcast (core) server 34 and the cache server 15.

The staging server 30 includes a terrestrial staging server 31 and a corporate staging server 32. The respective staging servers 31, 32 function to prepare files for broadcast to individual (low bandwidth) and corporate (high bandwidth) clients. The staging servers 31, 32 are coupled to the video server 33 which stores the video 29 that is combined with the static HTML pages 27 output by the respective staging servers 31, 32. The staging servers 31, 32 are coupled to the broadcast server 34 which stores the presentation and transmits the streaming media content by way of a satellite transmitter (not shown) to the satellite 14. The streaming media content on the broadcast server 34 are pushed to the cache server 15.

Figure 3:
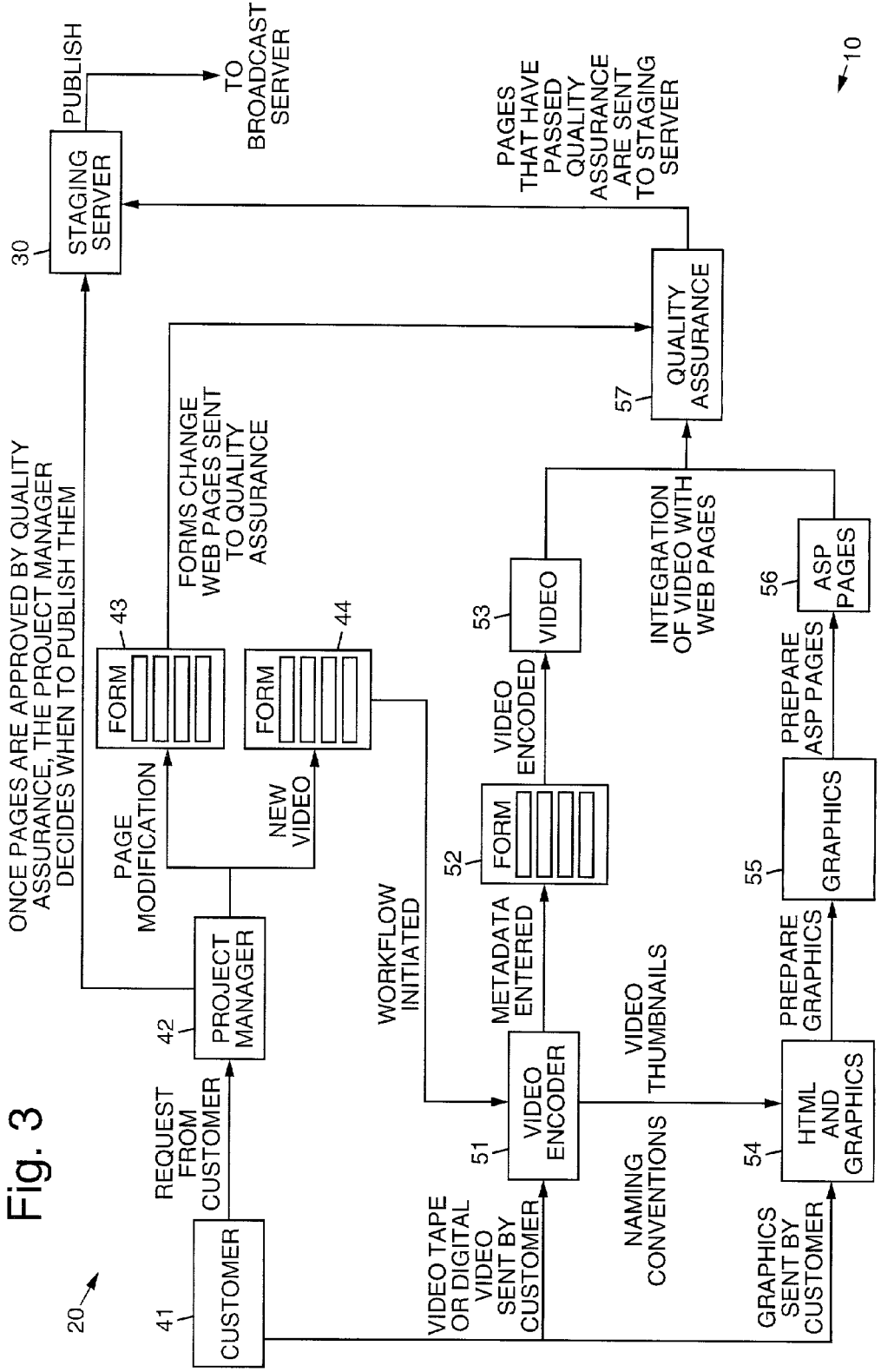
FIG. 3 illustrates the workflow performed in implementing the exemplary streaming media publishing system shown in FIG. 1.

Referring now to FIG. 3, it illustrates workflow operations performed in creating and publishing a streaming media presentation in the exemplary streaming media publishing system 10. A customer 41 initiates a request that is submitted to a project manager 42. The project manager 42 creates page modification and new video forms 43, 44 which are sent to a quality assurance operator 57.

The customer 41 submits an analog video tape or digital video that is processed by a video encoder operator 51. The analog video tape or digital video is processed by the video encoder operator 51 to produce video thumbnails and metadata. Graphics submitted by the customer 41 is combined with the video thumbnails produced by the video encoder operator 51 to generate HTML and graphic images 54. The metadata is entered into a form 52 by the video encoder 51 and the video data is encoded to produce encoded video 53.

Graphics forwarded by the customer 41 along with the thumbnails are processed to produce HTML and graphic images 55. Web ASP/HTML pages 56 (Active Server Pages/HyperText Markup Language pages) are prepared from the thumbnails and graphic images 55. The quality assurance operator integrates the video 53 with the web (ASP/HTML) pages 56 to create the presentation and sends it, if it has passed appropriate quality assurance tests, to the staging server 30. The presentation is transferred from the staging server 30 to the broadcast server 34 for storage and transmission by way of the satellite 14 to the cache server 15 and client personal computers 16.

More particularly, the streaming media publishing system 10 takes information such as text, video, news feeds, audio, graphics, transcripts and other content and generates finished web pages and video. The system processes the raw content and media assets to generate the finished web pages and video. The finished web pages and video are distributed by way of the satellite 14 to one or more cache servers 15 located at Internet service providers (ISPs) or attached to corporate networks 17.

Content that is in an analog format is digitized. A workstation is used to digitize analog content that includes a high resolution scanner, Adobe Photoshop software, Optical Character Recognition (OCR) software, an audio tape player coupled to a sound card on the workstation, and audio editing software such as is available from Sound Forge, for example.

Video encoding from tape or a digital asset is done using a Virage encoding system, for example (which performs the video encoding shown in FIG. 2, operations 52, 53). The results of the video encoding are a VDF file and a digital Real or Windows Media that are uploaded to the video server 33.

Analog textual data 28 that is received (printed pages), such as transcripts, for example are digitized and corrected using the OCR software. This data comprises metadata that is transferred to the Virage encoding system for processing.

Audio arriving on an analog audio tape is encoded in WAV format and transferred to the Virage encoding system for encoding in a Real Media or Windows Media format. Printed graphics is scanned into the Photoshop software using the high-resolution scanner and then fed into the FTP server 21 for processing.

Corporate customers are able to enter data regarding a video that is to be processed into a web-based form on the bar code submission and digital receiving (FTP) server 21. When a corporate customer submits the form, a web page is provided that contains a shipping label and a bar code on it. The bar code is attached to a tape by the corporate customer and shipped for processing.

Upon receipt, the bar code is scanned and the information associated with the video follows it through encoding to become part of the metadata. The bar code submission and digital receiving (FTP) server 21 this software resides on is publicly accessible.

Media uploads and file types that are supported include: any form of digital video; metadata or video associated metadata in VDF, ASCII or XML formats; text in Word or ASCII formats, or as transcripts; HTML; any digital audio file; and any graphics format supported by Adobe Photoshop.

Media content is acquired by way of mail or courier, electronically through email or the digital receiving (FTP) server 21, or via traditional video transmission (Verizon AVOC fiber, Williams VYVX, or satellite). All content that is received has an associated bar code generated by the bar code submission (FTP) server 21.

The Virage encoding system supports NTSC tape format standards including: Betacam SP DV (Mini and Standard DV tapes) DVCam, DVCPro, VHS, S-VHS, Betacam, and Betacam SP.

The Virage encoding system supports various streaming media standard for corporate LANs including Windows Media Technologies version 7, 320×240 frame size 0 300 Kbps stream rate, 24 Frames per second. The video encoder workstation 51 supports the following streaming media standard for terrestrial users: Windows Media Technologies version 7, 320×240 frame size, 56 Kbps stream rate, 12-15 frames per second, along with RealMedia 8 and QuickTime 4 streaming standards.

Various equipment is used to encode video streams for publishing using the system 10 including a Sony Betacam SP deck, Sony DVCam deck. Phillips VHS deck, a Canon GL-1 DV camera, a VGA Scan Line Converter Alesis audio processor, a Videonics DV switcher, a Mackie audio mixer, a Dell encoding workstation, and a JVC S-VHS deck.

Each Virage encoding system is capable of producing 4 hours of encoded content per day. Long format encoding (1 hour or longer) is encoded with a Microsoft Windows media encoder in real-time due to file size constraints with automated video encoding systems (Terran Media Cleaner and Telestream FlipFactory).

Short format tapes (<1 hour) are captured to disk as an AVI file and stored on an 80 gigabyte FireWire hard disk drive. The AVI files are transferred to a NetApp filer and are batch encoded.

Batch processing for video encoding is performed using Terran Media Cleaner Pro 5.0 software. All encoding session information is created for each customer in order to automate the batch encoding process. The Media Cleaner Pro 5 software batch processes AVI files in designated folders and transmits the encoded files to the proper location. Currently, Telestream FlipFactory is used as an automated batch encoding system. P Real-time encoding is used for long format taped events (1 to 4 hours in length). The taped events are played on a video tape deck and routed to the corresponding encoder. The video is processed in real-time. Longer events are broken down into two hour encoded files.

Virage metadata is collected during the encoding process. Metadata is most valuable when closed captioning text is associated with video in line 21 of the Vertical Blanking Interval (VBI). The Virage encoding system extracts this text and transforms it into searchable text. The use of searchable text enables a user to jump to the exact word in the streaming video based on a search. This is a novel aspect of the present invention.

A Windows IIS index server provides search capabilities. The index server processes pages and indexes the words on a page for searching purposes. The index server pays particular attention to the <meta> tag placed in the header of an HTML page. Using the index server, <meta> tag keywords are dynamically generated based on the video that is on the page which are used to direct a viewer to the corresponding video pages.

During encoding of ASP/HTML files, the encoder operator can place "markers" in the video that allow end users to jump to various points in the video. This is similar to chapertization in DVD consumer videos. While this technique does not allow the end user to search on key words, it does subdivide the video, provide the user with an index, and allow the user random access to the video.

HTML pages in the system 10 are updated through web-based forms (FIG. 2). These forms write to the SQL database. The ASP/HTML pages are generated from templates that pull data directly from these SQL database. The system 10 is used to manage many different assets. These assets include: video, metadata, Word documents, text, HTML, and graphics (raw and finished). These assets are stored in the SQL database.

The streaming media publishing system 10 allows content to be viewed in a web browser running on the client personal computers 16. The streaming media publishing system 10 acts as a content acquisition system, so that clients and third party vendors can upload into the SQL database. The system 10 allows the assets to be previewed before use.

Content on the asset management (content) server 23 is treated differently depending on media type. News feeds are parsed and placed into the SQL database. XML from editors is parsed and stored in the SQL database. Virage VDF metadata files is uploaded to the Virage database. Real Media and Windows Media video files are passed to the staging server 30. Text is processed to become editor data, metadata or HTML. HTML, audio, and graphics are passed to the staging server 30. The finished assets are automatically parsed into the SQL database or are transferred to proper directories on the staging server 30.

XML files can enter the system 10 in two ways. Editors can create them from other raw materials such as Word files, scripts or text documents or they can come from XML news feeds provided by third party providers. The XML files are parsed and automatically entered into the SQL database. HTML is passed directly to the SQL server. Virage VDF metadata files may be FTPed to a Virage search server, where the VDF metadata files are processed and become part of the searchable SQL database.

Video files are encoded into either the Real or Windows media format. Video files are transferred to the staging server 30 either manually or as an automated task. Audio files are encoded into either the Real or Windows media format. Audio files are transferred to the staging server 30 either manually or as an automated task. Graphics are processed to either GIF or JPG format and is passed to the staging server 30.

Several types of content from the asset management (content) server 23 enters the SQL database, including XML data, finished HTML pages and data entered into web based forms. XML files are parsed into the SQL database.

A program such as XBuilder by PostPoint Software may be used to generate dynamic ASP/HTML pages and change the extension to HTML to make them static pages. This processing takes place on-demand under control of the editors. The static pages are written to the staging server 30.

The static pages reside on the staging server 30 along with HTML and graphics. Video resides on separate servers, but is accessible from the staging server 30. The directory structure is the same as the on the broadcast server 34 so that quality assurance can be carried out.

The static HTML pages are placed on a staging server 30. The staging server 30 has an associated video server 33 from which it can access Windows Media files, for example. The arrangement of the staging server 30 and the video server 33 is identical to the broadcast (core) server 34. This is so that quality assurance can be performed before the files are published.

The web pages are published for use by corporate LAN users and users having access over a dial-up (terrestrial) connection. The pages generated from XBuilder are created for 300 kb/s viewing only. Once the pages are generated, a script is run that converts the ASX files from pointing to 300 kb/s files. They are converted to point to 56 kbps files and the path to the server is changed to reflect out third party hosting of on-demand video and live web content. The HTML pages are not changed.

Files are transferred from the staging server 30 to the broadcast (core) server 34 using NetApps Content Director software, for example. This software maintains synchronized directories between the staging server 30 and caches at the cache server 15 located at edge of the network.

The streaming media publishing system 10 provides a variety of services to clients. These include IP multicast transport service, IP multicast file transfer service, enterprise broadband desktop services, broadband desktop services, and content distribution network services.

The IP multicast transport service provided by the streaming media publishing system 10 provides enterprises, applications service providers (ASPs) and content providers needing transport through a global IP multicast communications platform with efficient distribution and replication of data to many servers owned and operated by the enterprise, application service provider or content provider.

The IP multicast file transfer service enables enterprises and content providers to reliably deliver large files to many servers with a guaranteed receipt for delivery. The data is transported to specified cache servers 15 accessible by users of the system 10.

Enterprise broadband desktop services include live streaming, on-demand streaming and premium content services.

The live streaming service enables an enterprise to reach its corporate audience with live streaming media delivery to desktops. The system 10 receives content by IP data transfer, videotape, and compact disc or MPEG. The information is processed and routed to selected cache servers 15 of the system 10 either by way of the satellite 14 or using terrestrial broadcasts by way of a modem 18.

The on-demand streaming service enables an enterprise to reach its audience with on-demand streaming to desktops. The content is delivered to cache servers 15 placed at enterprise locations, maximizing the probability of high quality delivery. The data at the cache server 15 is managed and updated as needed.

As for premium content services, content created by third parties may be processed and delivered live or on-demand to the enterprise over the system 10. Services include industry specific training and targeted industry news and information.

Figure 4:
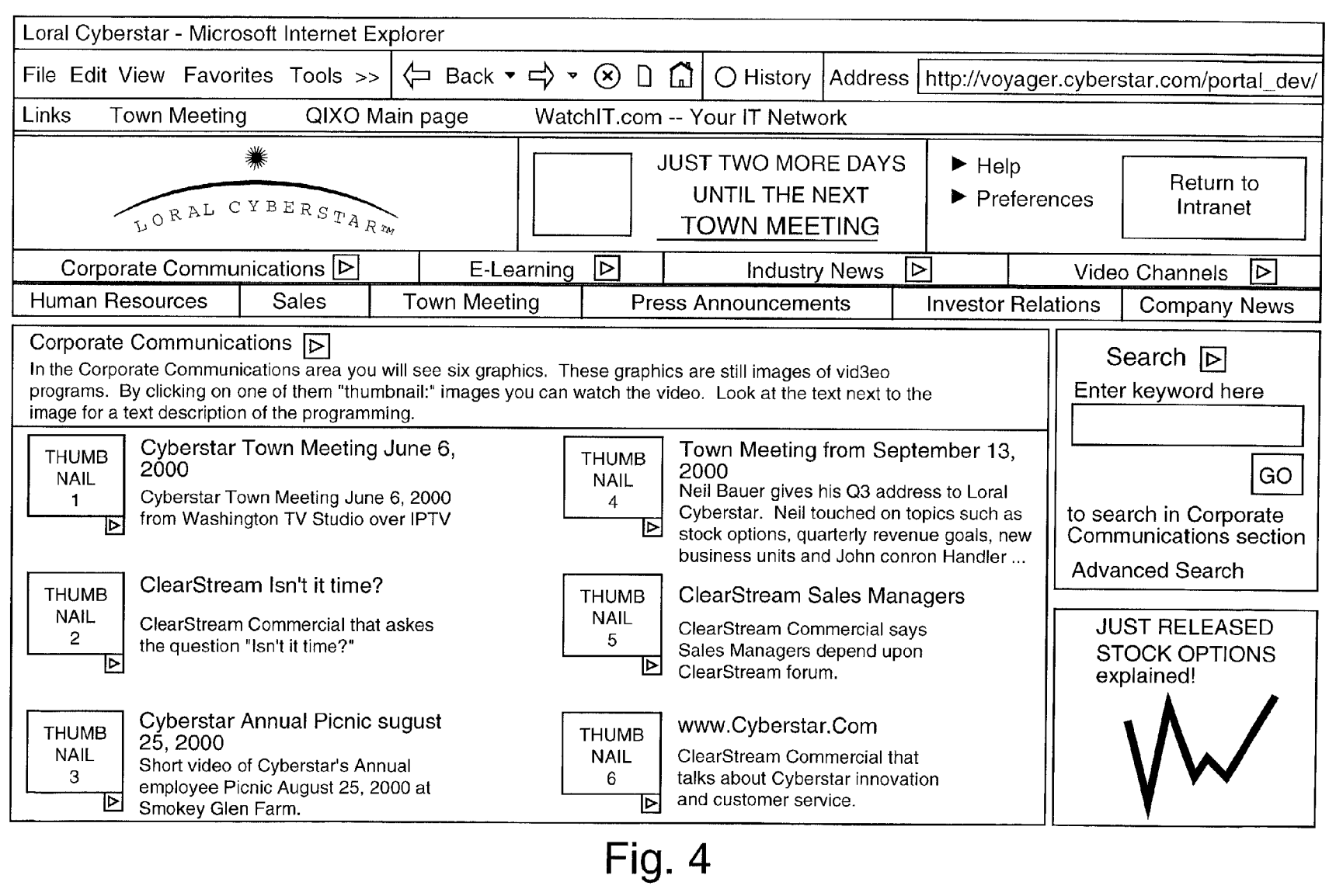

Broadband desktop features are provided by the system 10. On-demand and live video streaming are delivered from the servers to corporate desktops via a user desktop interface that provides HTML links to data stored in the cache servers 15. The interface provides the user an easy, organized intuitive way to access enterprise content. The interface includes the following, features: An exemplary interface is illustrated in FIG. 4.

The system 10 provides on-demand and live video and slide presentations for corporate communications; web based promotions and notifications of upcoming events; customized filtering of corporate media and industry news clips; industry-specific broadcast channels to the desktop; digital rights management for delivered media; encryption for delivery of confidential business information; and indexing and searching of archived video for fast retrieval.

Value-added services provided by the system 10 are that it provides a content acquisition network for delivering content to network access points, and encoding services for converting content to video formats for IP multicast transmission at varying transmission rates between 56 Kbps and 500 Kbps and higher.

Content providers currently provide information to their users over the Internet 12. However the quality of video streams delivered to the audience suffers due to network congestion. The system 10 enables content providers to reach enterprise desktops with high quality video streams. The type of video delivered to enterprises includes video-enabled marketing such as product demonstrations, product desk support and new product announcements. This provides a rich new marketing channel for business-to-business (B2B) companies currently using more traditional approaches such as direct mail advertising and industry trades.

FIG. 4 illustrates an exemplary user interface that may be employed in the streaming media publishing system 10. Video services are delivered through corporate LANs 17 via such an Internet-style user interface employed by users on their personal computers 16.

As is shown in FIG. 4, the user interface is a screen having an upper portion containing conventional browser selection buttons such as "File", "Edit:, View:, etc., various customized links including "Town Meeting", "QIXO Main Page" and "WatchIT.com—Your IT Network" links. The "Town Meeting" link has been selected and the bottom left-side portion of FIG. 4 shows what is displayed. To the right of FIG. 4 are a search button, a keyword entry box, and a "Stock Option Explained" link.

The "Town Meeting" link shows six graphic image icons or thumbnails to the left of respective textual explanations of what will be displayed if the graphic icon is selected. The graphic icons link to the respective video presentations that are displayed when they are selected.

Referring now to FIG. 5, it is a flow diagram that illustrates an exemplary streaming media publishing method 60 in accordance with the principles of the present invention. The exemplary method 60 comprises the following steps.

Graphics and text associated with a streaming media presentation are selectively processed 61 to create a dynamic hypertext markup language (HTML) page corresponding thereto. Video and audio are processed 62 to extract metadata associated with the presentation. The video, audio and metadata are encoded 63 in a predetermined video format. The dynamic HTML page is converted 64 into a static HTML page. The static HTML page is integrated 65 with the encoded video, audio and metadata. The streaming media presentation comprising the integrated static HTML and encoded video, audio and metadata is transmitted 66 or broadcast 66 (preferably over a satellite link) to a remotely located server computer where it is stored 67. A personal computer coupled to the server computer is used to access and view 68 the streaming media presentation using web browser software. The streaming media presentation may be searched 69 in the manner discussed above.

In summary, corporations and content providers are seeking to spend less money to reach more people, more often, at more locations around the world in order to leverage investments made to standardize corporate desktops and Internet Protocol (IP) network infrastructures. Technology improvements in IP networking and desktop computer performance enable corporations to send broadband video communications to the desktop. Content services delivered by broadband video communications include corporate communications, training, industry news and information, and distance learning. Corporations are focused on delivering new content services to employees to reduce costs and increase productivity.

The present invention may be used to coordinate geographically dispersed work forces by providing video-enriched communications such as CEO employee addresses, employee orientation, human resource policy updates, motivational training and other communications best delivered by the corporation's most capable communicators. The present invention may be used to reduce travel time and expenses associated with meetings and training over long distances.

The present invention may be used to better educate employees, improve job satisfaction and reduce turnover with e-learning content and services delivered to the desktop. The present invention may be used to enable headquarters to more efficiently communicate with field staff to execute product launches and Enable employees to stay current with fast changing business news with video enriched media.

The present invention may be used to reduce human intervention for help desk functions by delivering providing video frequently asked questions to common questions or repetitive processes. The present invention may be used to attract a larger corporate audience and increase retention of information.

The present invention may be used to measure the effectiveness of e-learning services delivered to improve future learning services. The present invention may be used to communicate sales strategies and delivery of sales training globally. The present invention may be used to enhance communications capabilities to customers and affinity networks.

Thus, a streaming media publishing system and method for use in delivering streaming media services to personal computers have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A streaming media publishing system comprising:
   a source of media content comprising video, audio and textual content;
   a content processing center coupled for receiving the media content from the source of media content, and for processing the received media content to generate a streaming media presentation comprising integrated static HTML pages and encoded video, audio and metadata;
   a satellite for transmitting the streaming media presentation;
   a cache server for receiving and storing the transmitted streaming media presentation;
   one or more client personal computers coupled to the cache server that each comprise browser software for accessing the streaming media presentation stored on the cache server and displaying the streaming media presentation.

2. The system recited in claim 1 wherein the streaming media presentation is searchable using the metadata integrated with the video and audio.

3. A streaming media publishing method comprising the steps of:
   selectively processing graphics and text associated with a streaming media presentation to create a dynamic hypertext markup language (HTML) page corresponding thereto;
   processing video and audio to extract metadata associated with the presentation;
   encoding the video, audio and metadata in a predetermined video format;
   converting the dynamic HTML page into a static HTML page;
   integrating the static HTML page with the encoded video, audio and metadata;
   transmitting the streaming media presentation comprising the integrated static HTML page and encoded video, audio and metadata to a remotely located cache server where it is stored.
   accessing and viewing 68 the streaming media presentation using web browser software disposed on a personal computer coupled to the cache server.

4. The method recited in claim 3 wherein the streaming media presentation is transmitted 66 over a satellite link.

5. The method recited in claim 3 further comprising the step of searching the streaming media presentation using metadata contained within the presentation.

* * * * *